United States Patent Office 2,846,298
Patented Aug. 5, 1958

2,846,298

METHOD OF DEFOLIATING PLANTS WITH SULFENYL AND THIOSULFENYL XANTHATES

Charles W. Osborn and Lyle D. Goodhue, Bartlesville, Okla., assignors to Phillips Petroleum Company, a corporation of Delaware No Drawing. Application August 11, 1953
Serial No. 373,682

19 Claims. (Cl. 71—2.3)

This invention relates to defoliation of plants. In one aspect, it relates to the provision of certain compounds novel in their application to defoliation of plants. In another aspect of the invention, it relates to a method for defoliating plants such as cotton, etc.

Plant defoliating agents are used to expedite the harvest of cotton, tomatoes, beans, and other crops. Their purpose is to provide an effect similar to that produced by a light frost which causes dropping of the leaves from the plants. In the case of cotton, defoliation is especially advantageous whether the crop is picked mechanically or by hand. In defoliated cotton the increased exposure to sun and the drying action of air movement cause mature bolls to open faster, prevent or reduce boll rot, and retard fiber and seed deterioration. Picking is facilitated when the plants are defoliated. Mechanical harvesting is more efficient in cotton fields that have been defoliated since leaves which would clog the spindles have already been removed. Other advantages of cotton defoliation are that it aids in insect control, eliminates a source of green leaf stain to lint, and reduces leaf trash which would be difficult to remove from the lint at the gin. Still another advantage of defoliation is that the crop can be harvested earlier, i. e., prior to frost and wet weather conditions, and a better product can thereby be obtained. Defoliation employing a plant defoliating agent is practiced upon plants which are ready for defoliation, that is, upon plants which are sufficiently mature that they can respond to treatment with a defoliating agent. It is necessary that a crop be formed before a plant defoliant is applied in order that the yield will not be reduced. In other words, defoliants are applied to mature plants. If cotton is defoliated too soon, the quality of the fiber is reduced.

We have now discovered that sulfenyl and thiosulfenyl xanthates are effective plant defoliants. Sulfenyl and thiosulfenyl xanthates can be represented by the formula

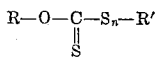

wherein R and R' are organic radicals in the class of alkyl, cycloalkyl, aryl, alkaryl, and aralkyl groups, $n$ is an integer and can be one of 2 and 3, and R and R' can be the same or different. When R or R' is an alkyl group, the number of carbon atoms in the group is generally between one and 16. An aryl or alkaryl group will generally contain between 6 and 16 carbon atoms and a cycloalkyl group will generally contain not more than 16 carbon atoms and will preferably contain 5 or 6 carbon atoms in the cycloalkyl ring. A method for the production of these compounds by the interaction of a metal xanthate with an organic sulfur halide, such as a sulfenyl or a thiosulfenyl halide, is disclosed in U. S. Patent No. 2,574,829. Typical compounds which are applicable include O-methyl-S-tert-butyl-sulfenyl xanthate, O-methyl-S-tert-butylthiosulfenyl xanthate, O-ethyl-S-tert-butylsulfenyl xanthate, O-ethyl-S-tert-butylthiosulfenyl xanthate, O-isopropyl-S-tert-butylsulfenyl xanthate, O-ethyl-S-dodecylsulfenyl xanthate, O-ethyl-S-dodecylthiosulfenyl xanthate, O-isopropyl-S-dodecylsulfenyl xanthate, O-phenyl-S-tert-butylsulfenyl xanthate, O-methyl-S-phenylsulfenyl xanthate, O-methyl-S-tolylthiosulfenyl xanthate, O-hexadecyl-S-tert-butylsulfenyl xanthate, O-ethyl-S-tert-hexadecylthiosulfenyl xanthate, O-isopropyl-S-cyclohexysulfenyl xanthate, O-4-decylphenyl-S-decylsulfenyl xanthate, O-methyl-S-phenyldecylthiosulfenyl xanthate, O-benzyl-S-tert-butylthiosulfenyl xanthate, and O-(diamylphenyl)-S-hexylnaphthylsulfenyl xanthate.

According to this invention, therefore, there has been provided a method for defoliating plants which comprises applying to the leaves of said plants, when said plants are responsive to a defoliating agent, defoliating quantities of a compound selected from the sulfenyl and thiosulfenyl xanthates. As noted below, the functional or critical portion of the compounds of the method of the invention is found in the nucleus or the configuration of the sulfenyl and the thiosulfenyl grouping and not in the R or R' portions, although it is not intended hereby to lead to the belief that all of the R and R' radicals for which R and R' stand in the formula given are necessarily more than alternatives. The point to note is that departure from the structure of the sulfenyl or the thiosulfenyl nucleus will be critical in the sense that no defoliation activity can be expected.

Although the defoliants of this invention are described and claimed as sulfenyl and thiosulfenyl xanthates, it has been observed that with different methods of preparation of these compounds, results of varying character can be obtained. Therefore, it is believed, now, that there may be present in the final product activating or deactivating impurities or by-products, acting to some extent, to modify the results which would be obtained with the pure materials. However, it is to be understood that herein and in the claims the invention includes any such impurities or by-products which may be present, it being clear that we have set forth, herein and in the claims, a sufficient description to enable one skilled in the art to obtain the results we have obtained, and therefore, have complied with the requirements of the law.

As stated, the defoliants of this invention are now believed to be sulfenyl and thiosulfenyl xanthate compositions and they are prepared by the interaction of an alkali metal xanthate with a reaction product of a mercaptan or an organic disulfide and a halogen. The reaction of a halogen with an alkyl mercaptan or a dialkyl disulfide is described in a copending application of Chester M. Himel, Serial No. 89,475, filed April 25, 1949, now abandoned. Other mercaptans and disulfides can also be employed, i. e., compounds of the formulas R'SH and R'SSR' in which the R' groups are as defined herein. Mercaptans and disulfides react under anhydrous conditions with halogen at temperatures in the range between —300 and 150° F., to form compounds which are designated as sulfenyl and thiosulfenyl halides. The reaction is effected in the presence of a solvent which does not react with any of the materials present in the system. Whether the sulfenyl or thiosulfenyl halide predominates in the reaction product is dependent largely upon the reaction conditions, as described in said Serial No. 89,475.

Solvents for the preparation of the said halide, which are frequently preferred, according to this invention, are paraffinic and aromatic hydrocarbons. Single hydrocarbon compounds or mixtures are applicable. Paraffinic hydrocarbons which can be employed include those of relatively low boiling point such as pentanes and hexanes. Of particular interest are the highly branched isoparaffinic hydrocarbons containing from 9 to 20 carbon atoms per molecule, having boiling points in the range between 260 and 800° F. These materials can be obtained from any suitable source. Convenient methods for their preparation include alkylation of isoparaffins with monoolefins employing such catalysts as hydrogen fluoride, aluminum chloride, sulfuric acid, or the like, under conditions suitable in the case of each catalyst. Aromatic hydrocarbons such as benzene, toluene, and xylenes can also be employed as solvents for the reaction. Halogenated solvents such as chloroform, carbon tetrachloride, ethylene dichloride, ethylidene chloride, and the like are also applicable.

The halogens that can be used are chlorine, bromine, and iodine, and of these chlorine is preferable on account of its low cost and availability. Generally, from one to two mols of halogen per mol of mercaptan or disulfide is employed.

The reaction between a sulfenyl or thiosulfenyl halide and an alkali metal xanthate proceeds smoothly at substantially room temperature and atmospheric pressure. In general, the operating temperatures lie between −5 and 175° F. It is usually preferred that from one to two mols xanthate per mol sulfenyl or thiosulfenyl halide be employed.

In one method of preparing the sulfenyl and thiosulfenyl xanthates of this invention, the solution of the sulfenyl or thiosulfenyl halide prepared as described above is brought into contact with an aqueous solution of an alkali metal xanthate. The sulfenyl or thiosulfenyl halide solution can be added to the aqueous solution of the xanthate or vice versa. At the conclusion of the reaction the mixture is allowed to stratify and the aqueous and organic phases are separated. The organic phase can be employed directly as the defoliant composition.

Another method for preparing the sulfenyl and thiosulfenyl xanthates of this invention comprises reacting a sulfenyl or thiosulfenyl halide with an alkali metal xanthate by first preparing a slurry of the xanthate in an organic medium, preferably a hydrocarbon oil of the type described above, i. e., a highly branched isoparaffinic hydrocarbon containing from 9 to 20 carbon atoms per molecule having boiling points in the range between 260 and 800° F. or an aromatic hydrocarbon such as benzene, toluene, or xylene and contacting the slurry with the halide. Mixtures of hydrocarbons can also be employed to prepare the slurry. At the conclusion of the reaction, the mixture is filtered to remove unreacted alkali metal xanthate and any alkali metal halide formed. The defoliating composition thus obtained is ready for application to plants.

If a low boiling solvent is employed in any step of the preparation of the defoliants of this invention, it is desirable that such solvent be deplaced with hydrocarbon oils boiling in the range between 260 and 800° F. since these hydrocarbon oils often enhance the defoliating action of the composition. By so operating, too rapid evaporation of the solvent, often accompanied by fire hazards, is avoided.

These compounds are effective defoliants when applied to plants in any suitable form such as solutions, emulsions, aerosols, fogs, or dusts. When fogging methods are employed, temperatures in fog generating devices should be below temperatures which can cause decomposition of the defoliants. It is convenient to apply the compounds as aqueous emulsions in the form of a spray. These compounds are also advantageously adaptable for application by aircraft as mechanical dispersions or mists produced by high velocity air jet devices.

Any suitable carrier or solvent may be employed which is inert with respect to the active defoliating agent and which will not provide a harmful effect on cotton, tomatoes, beans, or other crops when applied thereto. Carriers or solvents which are particularly applicable and frequently preferred are hydrocarbon oils which boil in the range from about 260 to about 800° F., preferably 300 to about 600° F. and include high boiling isoparaffins such as are obtained in the alkylation of paraffins with olefins employing catalysts such as hydrogen fluoride, aluminum chloride, sulfuric acid, or the like; also, kerosene, fuel oil, Stoddard solvent, cleaner's naphtha, and diesel fuel. Other solvents or carriers which are applicable are disulfides, e. g., di-tert-octyl disulfide. Talc, kieselguhr, and other inert carriers can be used in preparing dusts. Water can be used advantageously to form emulsions of the compounds herein described for spraying. When preparing aqueous emulsions, wetting or emulsifying agents such as Triton X100 (alkyl aryl polyether alcohol), Dresinate 731 (sodium salt of a disproportionated rosin acid), Tween 20 (polyoxyalkylene derivative of sorbitan monolaurate), and the like are employed in sufficient quantity to stabilize the emulsion.

The defoliants of the present invention are effective when applied in amounts in the range between 0.01 and 25 pounds of sulfenyl or thiosulfenyl xanthate per acre, preferably in amounts in the range between 0.04 and 10 pounds per acre. The amount of carrier employed can be varied over a broad range. When a liquid carrier, e. g., a hydrocarbon oil of the type described, is employed, the amount of finished solution to be applied per acre is first established and the amount of active ingredient is then adjusted. If it is desired to apply 70 gallons per acre of the finished solution, the quantity of active ingredient is generally in the range between 0.005 and 2.0 percent by weight, based on the carrier. When emulsions are employed instead of solutions, they contain similar amounts of the active ingredient. If it is desired to apply a smaller quantity of finished solution or emulsion per acre, the ratio of active ingredient to carrier is increased. The defoliants of this invention can be applied in admixture with each other and/or with other agents which can be defoliating in character.

*Example 1*

Di-tert-butyl disulfide (89 grams, 0.5 mol) was treated in refluxing propane with 0.5 mol+10 percent excess chlorine. The propane was then replaced with n-pentane.

Potassium ethyl xanthate was prepared by dissolving one mol KOH in 3 mols ethanol and adding 500 cc. ether. One mol carbon disulfide was then introduced dropwise into the mixture. The xanthate was filtered and dissolved in water.

The solution of the reaction product of di-tert-butyl disulfide with chlorine was added to the potassium ethyl xanthate solution while the mixture was stirred. The organic layer was washed, dried, and the solvent was removed. The residue weighed 122 grams. Analysis gave the following results: S, 51.11 percent; $n_D^{20}$ 1.5942. The product was predominantly O-ethyl-S-tert-butylthiosulfenyl xanthate.

The product prepared as described above was employed for the preparation of solutions of variable concentrations in different solvents. Two hundred cubic centimeters of each solution was applied by means of a pressurized sprayer to 15 to 20 feet of a row of cotton plants (Delapine-15) which ranged from 18 to 36 inches in height (sprayed to run-off). The amount of solution was sufficient to cover (sprayed to run-off) the cotton plants thoroughly. The following table shows the solvent employed, concentration of solutions, and results of defoliation tests.

| Solvent | Concentration of solution wt. percent | Percent Defoliation After— | |
|---|---|---|---|
| | | 1 Week | 2 Weeks |
| HF heavy alkylate [1] | 0.25 | 99 | 100 |
| Do.[1] | 0.167 | 15 | 97 |
| Do.[1] | 0.125 | 99 | 100 |
| Stoddard solvent | 0.125 | 98 | 98 |
| Do | 0.063 | 80 | 98 |
| Do | 0.008 | 75 | 99+ |
| Diesel fuel | 0.031 | 80 | 97 |
| Kerosene | 0.031 | 25 | 90 |
| Furnace oil | 0.031 | 50 | 92 |

[1] Soltrol 180, approximate boiling range 400–500° F.

For comparative purposes two runs were made using a commercial product, Endothal (sodium 3,6-endoxy hexahydrophthalate), in aqueous solutions in concentrations of 0.2 and 0.05 weight percent, respectively. After a two-weeks period, the 0.2 percent solution gave a defoliation of 30 percent and the 0.05 percent solution gave a defoliation of 65 percent. Plants which were not treated with a defoliating agent showed less than 5 percent defoliation in two weeks.

*Example II*

Potassium ethyl xanthate was prepared by dissolving 1.1 mols (61 grams) KOH in 3 mols (138 grams) ethanol and adding one liter of ether and one mol (76 grams) carbon disulfide. Water (300 cc.) was added and the mixture was stirred. The ether and water layers which were obtained were separated and the water layer containing the potassium ethyl xanthate was employed in the preparation of a defoliant composition as follows:

Di-tert-butyl disulfide (89 grams, 0.5 mol) in 1200 cc. n-pentane was treated with 0.5 mol (35.5 grams) chlorine. The aqueous solution of potassium ethyl xanthate was then added dropwise to the solution of the reaction product of di-tert-butyl disulfide with chlorine while the reaction mixture was stirred. Stirring was continued for several hours, the aqueous layer was separated, and the organic layer was washed, dried, and the pentane removed. The residue weighed 182 grams. It was distilled under reduced pressure. A fraction boiling at 74° C. at 1 mm. Hg (124 grams) had a refractive index, $n_D^{20}$, of 1.5592. The product was predominantly O-ethyl-S-tert-butylsulfenyl xanthate.

Solutions of two different concentrations of the product described above in HF heavy alkylate (Soltrol 180) were prepared and used in cotton defoliation tests as described in Example I. The following results were obtained:

| Concentration of solution, wt. percent | Defoliation After— | |
|---|---|---|
| | 1 Week | 2 Weeks |
| 0.5 | 80 | 95 |
| 0.25 | 80 | 92 |

*Example III*

Potassium isopropyl xanthate was prepared by the reaction of isopropyl alcohol, KOH, and $CS_2$. The reaction product was dissolved in water and the solution added dropwise to a solution prepared by treating di-tert-butyl disulfide with chlorine in n-pentane as described in Example II. The mixture was stirred during the reaction, the aqueous and organic layers were separated, and the organic layer washed with water, dried, and the pentane removed. The product was distilled under reduced pressure and a sample of the distillate dissolved in HF heavy alkylate (Soltrol 180) to give a 0.5 weight percent solution. This solution was applied to cotton plants as described in Example I. After one week 95 percent defoliation was observed and after two weeks it had reached 97 percent.

*Example IV*

The product of the reaction of potassium ethyl xanthate with the di-tert-butyl disulfide-chlorine reaction product, prepared as described in Example I, was employed for the preparation of an aqueous emulsion containing 0.063 percent by weight of this material using a tert-dodecyl mercaptan-ethylene oxide condensation product as the emulsifying agent. (The emulsifying agent was prepared by condensing one mol of tert-dodecyl mercaptan with 11 mols of ethylene oxide.) The emulsion was sprayed onto cotton plants in the manner described in Example I. The plants were 85 percent defoliated after a period of two weeks.

*Example V*

Di-tert-butyl disulfide (44.5 grams, 0.25 mol) was dissolved in 400 cc. of HF heavy alkylate (Soltrol 180) and the mixture cooled to −40° F. The reactor was purged with nitrogen. Chlorine (20 grams, 0.28 mol) was introduced below the surface of the mixture over a 5-minute period while the mixture was stirred. The temperature was allowed to increase to +5° F. and the reaction mixture was then added to a slurry of 65 grams (0.45 mol) sodium ethyl xanthate in 100 ml. of HF heavy alkylate. The temperature increased to about 175° F. during the reaction. The addition required 2–3 minutes and the reactants were stirred during this period and for 30 minutes thereafter. The mixture was filtered to remove unreacted sodium ethyl xanthate and sodium chloride.

Seven cubic centimeters of HF heavy alkylate was added to 8 cc. of the product described above, also in HF heavy alkylate. The mixture was sprayed onto cotton plants (Delapine-15) that were approximately 20 inches high. The amount of defoliant material applied was calculated to be approximately 1.965 pounds per acre. At the end of 7 days, 96 percent defoliation had occurred.

*Example VI*

Di-tert-butyl disulfide (89 grams, 0.5 mol) was dissolved in 500 cc. of HF heavy alkylate (Soltrol 180). The reactor was purged with nitrogen, the mixture was cooled to −75° F., and 64 grams (0.9 mol) of chlorine was introduced over a 13-minute period. The mixture was stirred during the reaction and the temperature increased to −40° F. Stirring was continued for 12 minutes after addition of the chlorine.

Potassium ethyl xanthate (144 grams) was dissolved in 200 cc. water. The solution of the reaction product of di-tert-butyl di-sulfide with chlorine was added, with stirring, to the xanthate solution over a 5-minute period and stirring was continued for 10 minutes thereafter. The temperature increased to about 175° F. during the reaction. The aqueous layer was separated, the organic layer was washed with three 100 cc.-portions of water, and dried over anhydrous calcium sulfate. The product was then placed in a flask under vacuum and the flask was placed in a water bath which was heated by means of an electric hot plate. During the heating period of 1.5 hours the water in the water bath boiled away. The volume of the reaction mixture decreased from approximately 600 cc. to 100 cc. during the heating period which indicated that practically all the HF alkylate had been removed.

Solutions were prepared containing 2, 1.2, 1.1, and 0.55 cc., respectively, of the above described material in sufficient HF alkylate to give 15 cc. of solution. Each of these solution was sprayed onto cotton plants in a chamber 6' x 6' x 6' (Peet-Grady chamber). Results are shown in the following table:

| Amount of Defoliant, cc. | Number of Plants Treated | Total Leaves | Defoliation | | Approximate Application Per Acre, Lbs.[1] |
|---|---|---|---|---|---|
| | | | Percent | Time | |
| 2.0 | 2 | 24 | 100 | 48 hrs | 6 |
| 1.2 | 1 | 18 | 100 | 48 hrs | 3.5 |
| 1.1 | 3 | 55 | 100 | 48 hrs | 3.3 |
| 0.55 | 1 | 17 | 94 | 9 days | 1.5 |

[1] Calculated values.

Reasonable variation and modification are possible within the scope of the foregoing disclosure and the appended claims to the invention, the essence of which is that sulfenyl and thiosulfenyl xanthates, especially prepared as herein described, have been found to be effective plant defoliants and that there has been provided a method for defoliating plants, especially cotton plants, which comprises applying to the leaves of said plants when the said plants are responsive to defoliating agents one of the said sulfenyl and/or thiosulfenyl xanthates in a defoliating quantity.

We claim:

1. A method for defoliating a plant which comprises applying to the leaves of said plant when said plant is responsive to a defoliating agent a small but effective defoliating quantity of a compound which can be represented by the formula $$R-O-\underset{\underset{S}{\|}}{C}-S_n-R'$$

wherein R and R' are organic radicals in the class of alkyl, cycloalkyl, aryl, alkaryl, and aralkyl groups, and n is an integer which is one of 2 and 3 and wherein R and R' can be different and wherein whenever at least one of the R's is an alkyl group the number of carbon atoms in the group is not more than 16, whenever at least one of the R's is one of an aryl and alkaryl group the group contains 6–16 carbon atoms, and whenever at least one of the R's is a cycloalkyl group the group contains not more than 16 carbon atoms with 5–6 carbon atoms in the cycloalkyl ring.

2. A method for defoliating a plant which comprises applying to the leaves of said plant when said plant is responsive to a defoliating agent 0.01–25 pounds per acre of a compound which can be represented by the formula $$R-O-\underset{\underset{S}{\|}}{C}-S_n-R'$$

wherein R and R' are organic radicals in the class of alkyl, cycloalkyl, aryl, alkaryl, and aralkyl groups, and n is an integer which is one of 2 and 3 and wherein R and R' can be different and wherein whenever at least one of the R's is an alkyl group the number of carbon atoms in the group is not more than 16, whenever at least one of the R's is one of an aryl and alkaryl group the group contains 6–16 carbon atoms, and whenever at least one of the R's is a cycloalkyl group the group contains not more than 16 carbon atoms with 5–6 carbon atoms in the cycloalkyl ring.

3. A method for defoliating a plant which comprises applying to the leaves of said plant when said plant is responsive to a defoliating agent a small but effective defoliating quantity of a compound which can be represented by the formula $$R-O-\underset{\underset{S}{\|}}{C}-S_n-R'$$

wherein R and R' are organic radicals in the class of alkyl, cycloalkyl, aryl, alkaryl, and aralkyl groups, and n is an integer which is one of 2 and 3, wherein R and R' can be different and wherein whenever at least one of the R's is an alkyl group the number of carbon atoms in the group is not more than 16, whenever at least one of the R's is one of an aryl and alkaryl group the group contains 6–16 carbon atoms, and whenever at least one of the R's is a cycloalkyl group the group contains not more than 16 carbon atoms with 5–6 carbon atoms in the cycloalkyl ring, dispersed in a suitable carrier.

4. A method according to claim 3 wherein said carrier is a solvent.

5. A method according to claim 3 wherein said carrier is a hydrocarbon solvent.

6. A method according to claim 3 wherein said carrier is water and an emulsifying agent.

7. A method according to claim 3 wherein said carrier is an HF alkylate isoparaffin.

8. A method according to claim 3 wherein said carrier is diesel fuel.

9. A method according to claim 3 wherein said carrier is kerosene.

10. A method according to claim 3 wherein said carrier is furnace oil.

11. A method according to claim 3 wherein water and an emulsifying agent are present in the carrier, said emulsifying agent being the condensation product of tertiary dodecyl mercaptan with ethylene oxide.

12. A method of defoliating a plant which comprises applying to said plant when it is responsive to defoliating agents defoliating a quantity of O-ethyl-S-tert-butylthiosulfenyl xanthate.

13. A method of defoliating a plant which comprises applying to said plant when it is responsive to defoliating agents defoliating a quantity of O-ethyl-S-tert-butylsulfenyl xanthate.

14. A method of defoliating a plant which comprises applying to said plant when it is responsive to defoliating agents defoliating a quantity of O-isopropyl-S-tert-butylsulfenyl xanthate.

15. A method of defoliating a plant which comprises applying to said plant when it is responsive to defoliating agents defoliating a quantity of O-methyl-S-tert-butylsulfenyl xanthate.

16. A method of defoliating a plant which comprises applying to said plant when it is responsive to defoliating agents defoliating a quantity of O-methyl-S-tert-butylthiosulfenyl xanthate.

17. A method for defoliating a plant which comprises applying to said plant when said plant is responsive to a defoliating agent a defoliating quantity of a compound which can be represented by the formula $$R-O-\underset{\underset{S}{\|}}{C}-S_n-R'$$

wherein R and R' are organic radicals in the class of alkyl, cycloalkyl, aryl, alkaryl, and aralkyl groups, and n is an integer which is one of 2 and 3, wherein R and R' can be different, wherein whenever at least one of the R's is one of an aryl and alkaryl group, the group contains 6–16 carbon atoms, and wherein whenever at least one of the R's is a cycloalkyl group, the group contains not more than 16 carbon atoms with 5–6 carbon atoms in the cycloalkyl ring, and wherein the compound is used for defoliation as obtained from a reaction mass in which it is formed, that is, without further treatment thereof.

18. A method for defoliating a plant such as cotton which comprises applying thereto as an active defoliant ingredient O-ethyl-S-tert-butylthiosulfenyl xanthate dispersed in a defoliant adjuvant consisting essentially of diesel fuel.

19. A method for defoliating a plant which comprises applying to the leaves of said plant when said plant is substantially grown and its harvesting is desired, and it is responsive to a defoliating agent, 0.04–10 pounds per acre of a compound which can be represented by the formula

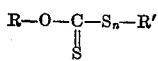

wherein R and R' are organic radicals in the class of alkyl, cycloalkyl, aryl, alkaryl, and aralkyl groups, and $n$ is an integer which is one of 2 and 3 and wherein R and R' can be different and wherein whenever at least one of the R's is an alkyl group, the number of carbon atoms in the group is not more than 16, whenever at least one of the R's is one of an aryl and alkaryl group, the group contains 6–16 carbon atoms, and whenever at least one of the R's is a cycloalkyl group, the group contains not more than 16 carbon atoms with 5–6 carbon atoms in the cycloalkyl ring.

References Cited in the file of this patent

UNITED STATES PATENTS

| | | |
|---|---|---|
| 2,574,829 | Himel et al. | Nov. 13, 1951 |
| 2,600,861 | Englund | June 17, 1952 |
| 2,607,673 | Goodhue et al. | Aug. 19, 1952 |
| 2,615,804 | Stewart et al. | Oct. 28, 1952 |
| 2,657,126 | Stewart et al. | Oct. 27, 1953 |
| 2,704,246 | Goodhue et al. | Mar. 15, 1955 |
| 2,795,525 | Stansbury et al. | June 11, 1957 |

FOREIGN PATENTS

| | | |
|---|---|---|
| 664,942 | Great Britain | Jan. 16, 1952 |

UNITED STATES PATENT OFFICE
CERTIFICATE OF CORRECTION

Patent No. 2,846,298                                         August 5, 1958

Charles W. Osborn et al.

It is hereby certified that error appears in the printed specification of the above numbered patent requiring correction and that the said Letters Patent should read as corrected below.

Column 6, line 75, for "solution" read -- solutions --; column 8, line 30, claim 12, line 34, claim 13, line 38, claim 14, line 42, claim 15, and line 46, claim 16, for "agents defoliating a", each occurrence, read -- agents a defoliating --.

Signed and sealed this 9th day of December 1958.

(SEAL)
Attest:

KARL H. AXLINE                                         ROBERT C. WATSON

Attesting Officer                                      Commissioner of Patents